Patented Oct. 3, 1939

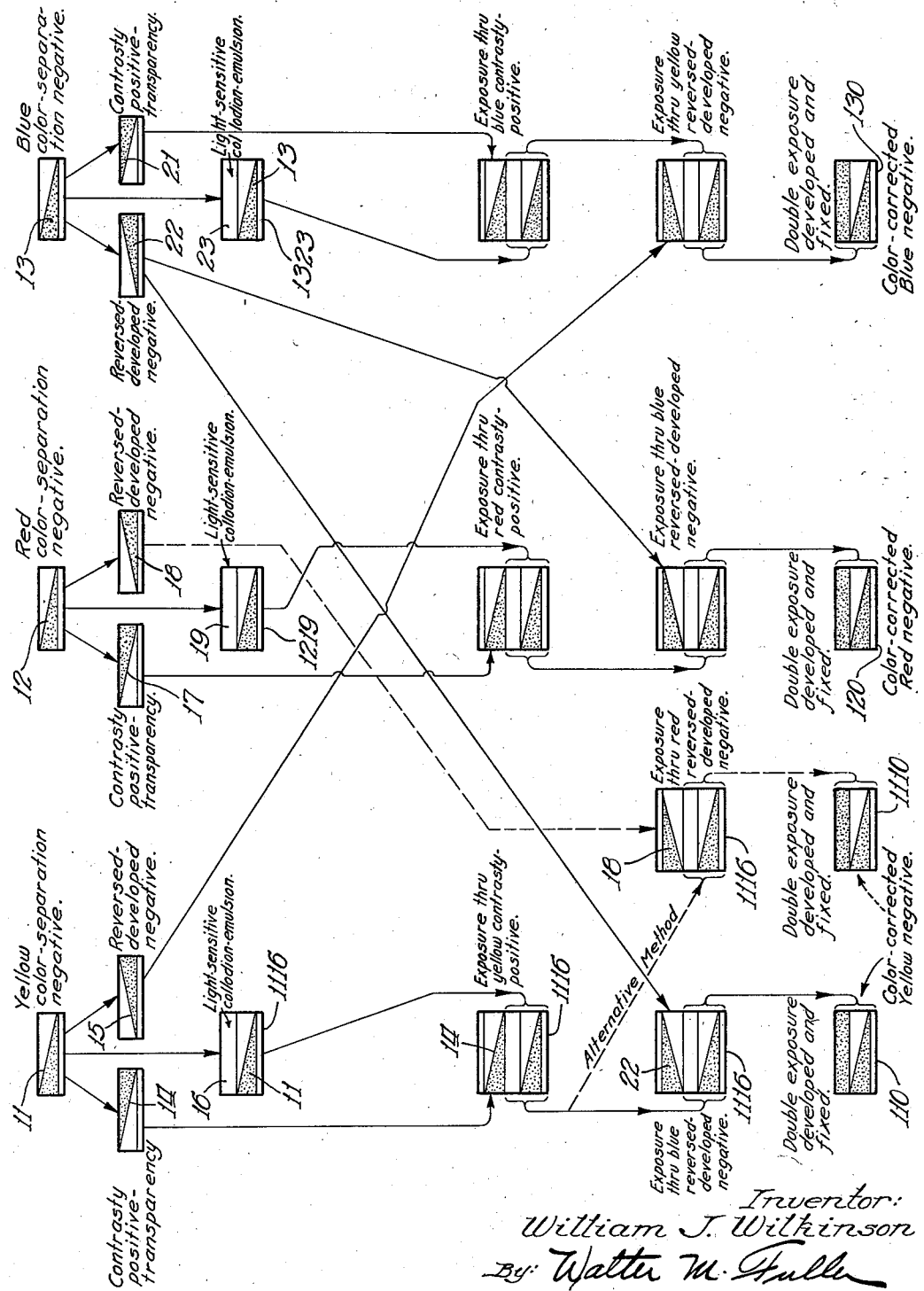

2,174,812

UNITED STATES PATENT OFFICE 2,174,812

MODIFICATION OF PHOTOGRAPHIC NEGATIVES

William J. Wilkinson, Eastchester, N. Y., assignor of one-half to Miehle Printing Press and Manufacturing Company, Chicago, Ill., a corporation of Illinois Application March 21, 1938, Serial No. 197,091

12 Claims. (Cl. 95—5.1)

The current invention pertains to certain novel features of betterment and advantage in the improvement of negatives for use in the preparation of printing-plates, and it concerns more particularly, but not necessarily restrictedly, certain procedures in the correction of color-separation negatives to be used in the making of printing-plates for the reproduction of a subject in its original colors.

One leading aim or object of the invention is to make the corrections or modifications in the negative or negatives in a manner so that the original image in the negative and the correction or corrections thereof will be almost in the same plane, whereby half-tone or hemi-tone positives may be made from the color-corrected negatives by direct contact printing through a suitable screen, thus giving the proper or desired dot-formation.

Another feature of the invention resides in the possibility of removing the corrective element, making it possible to remedy any errors in exposure due to improper judgment.

In order to permit those acquainted with this art to fully understand the invention, the present preferred method has been illustrated in detail in the single view of the accompanying drawing, in which an alternative method is represented by dash lines, and this drawing should be referred to in connection with the following detailed description.

Assuming that the usual three color-separation negatives, yellow 11, red 12, and blue 13, have been made of the subject through purple or violet, green, and orange or other appropriate filters, respectively a highlight positive-transparency 14 is made from the yellow-separation negative 11 on a contrasty-plate, a plate of this character being used to emphasize or accentuate the color values in the original negative 11.

Also a reversed-developed negative 15 is made from the same yellow-separation negative 11, whereupon the negative film surface of the latter is coated with a light-sensitive collodion-emulsion 16, such coated negative as a whole being designated 1116.

In similar manner, a contrasty positive-transparency 17 and a reversed-developed negative 18 are made from the red-separation negative 12, and then the latter is coated with the light-sensitive collodion-emulsion 19, the final coated negative being identified by the reference numeral 1219.

Following an analogous procedure, a contrasty positive-transparency 21 and a reversed-developed negative 22 are made from the blue-separation negative 13, after which the latter is supplied with its coating 23 of light-sensitive collodion-emulsion, such coated negative being denominated 1323.

Then the yellow, contrasty positive-transparency 14 is applied to the coating on the coated negative 1116 with its film in direct contact with the coating and also in precise registration with the negative, and the whole is exposed to light for a suitable period of time depending, of course, upon the degree of sensitivity of the coating and the intensity of the light employed.

Thereupon, the yellow positive-transparency 14 is removed from the coated, exposed negative 1116 and the blue reversed-developed negative 22 substituted therefor on the negative and the whole is exposed to light for the required time period, whereupon the member 22 is removed, and the double-exposed coating 16 developed and fixed in the usual way, thereby providing a corrected, yellow, separation-negative 110 in which the corrective or alterative stratum is in direct contact with, and in exact register with, the negative-stratum proper.

As an optional or discretional procedure, as indicated by the dash-lines in the drawing, instead of using the blue reversed-developed negative 22, the red reversed-developed negative 18 may be employed in its place, and after the development and fixing of the double-exposed collodion-emulsion, the alternative, color-corrected, yellow, separation-negative 1110 results.

The red color-separation negative 12 is treated in an analogous manner by effecting the double exposure through the red, contrasty, positive-transparency 17, and, at a different time, through the blue reversed-developed negative 22 in succession with subsequent development and fixing, thereby producing the final red color-corrected negative 120.

By a similar procedure, using the blue, contrasty, positive-transparency 21 and the yellow, reversed-developed negative 15 for the two exposures on the single light-sensitive coating 23 and developing and fixing such double-exposed coating, the blue, color-corrected negative 130 is made.

Those acquainted with this art will readily understand that the order of use of the positive-transparencies and the reversed-developed negatives is of no importance, because they are both used in connection with the single coatings, and it will also be apparent that the positive-transparencies and the reversed-developed negatives are made from their respective color-separation negatives before the latter are supplied with their light-sensitive collodion-emulsions.

In making the reversed-developed negatives every effort is desirably exercised to maintain the same degree of contrast therein as is in the corresponding original color-separation negatives.

From what precedes, it will be apparent that the stated use of the contrasty positive-transparencies accentuate the tones in the corrected negatives and that the indicated employment of the reversed-developed negatives modifies and corrects the color values of the negatives to eliminate therefrom the light defects therein by reason of the unavoidable imperfections in the filters used.

As simpler procedures, suitable for adoption in some cases, may be mentioned the use of the positive-transparencies, or the employment of the reversed-developed negatives each without the other, and with single, as distinguished from double, exposures.

Again, the use of the contrasty positive-transparency aids greatly in monotone work in that with its use a far greater tone range can be secured than is possible to obtain with the one exposure of the negative alone; that is to say, the monotone negative can be coated with a light-sensitive collodion-emulsion, after a contrasty positive-transparency has been made from it, and then this contrasty-positive is printed back on the applied sensitive-emulsion.

Inasmuch as the preferred longer and more exact method presented above involves many steps which are capable of execution at a variety of times, instead of in the exact order stated hereinabove, this is to be borne in mind in considering the scope of the appended claims which should be construed or interpreted as broadly as permitted by the state of the prior art.

Furthermore, several changes in the methods outlined above may be resorted to without departure from the substance and essence of the invention and without the loss or sacrifice of any of its material advantages.

Obviously, if the optional procedure presented by the dash-lines in the figure of the drawing is not used, there would be no occasion for making the red reversed-developed negative 18.

Again, it is conceivable that the contrasty positive-transparencies may be used alone with one or more of the separation negatives and the reversed-developed negatives employed alone with one or more other of the separation-negatives.

I claim:

1. In the method of correcting a set of yellow, red and blue separation-negatives of a subject, the following steps in any order consistent with the production of the specified results, making a positive-transparency from each of said three separation-negatives, making reversed-developed negatives from at least the yellow and blue separation-negatives, coating the negative-stratum of each of the three separation-negatives with a light-sensitive medium, applying to the negative-stratum of each of said three separation-negatives the positive-transparency made therefrom and with the positive-stratum of the transparency in contact with the coating and in register with the negative, exposing said coatings to light through said applied positive-transparencies, removing said positive-transparencies from said separation-negatives, applying the reversed-developed negative made from one of the other color-separation negatives to, and in register with, the coated yellow-separation negative with its negative-stratum in contact with the coating, exposing said coating to light through said applied reversed-developed negative, removing said reversed-developed negative from the coated yellow separation-negative, exposing the coating of the red separation-negative to light in like manner through the reversed-developed negative made from the blue separation-negative, removing said reversed-developed negative from the coated red separation-negative, exposing the coating of the blue separation-negative to light in like manner through the reversed-developed negative made from the yellow separation-negative, removing said reversed-developed negative from the coated blue separation-negative, and developing and fixing the double-exposed coatings of said three separation-negatives, thereby providing each thereof with a corrective-stratum in contact with, and in register with, its negative-stratum.

2. The method set forth in claim 1 in which each of said positive-transparencies is a contrasty positive-transparency.

3. In the method of correcting a set of yellow, red and blue separation-negatives of a subject, the following steps in any order consistent with the production of the specified results, making reversed-developed negatives from at least the yellow and blue separation-negatives, coating the negative-stratum of each of the three separation-negatives with a light-sensitive medium, applying the reversed-developed negative made from one of the other color-separation negatives to, and in register with, the coated yellow-separation negative with its negative-stratum in contact with the coating, exposing said coating to light through said applied reversed-developed negative, removing said reversed-developed negative from the coated yellow separation-negative, exposing the coating of the red separation-negative to light in like manner through the reversed-developed negative made from the blue separation-negative, removing the blue reversed-developed negative from the exposed coated red separation-negative, exposing the coating of the blue separation-negative to light in like manner through the reversed-developed negative made from the yellow separation-negative, removing said reversed-developed negative from the exposed coated blue separation-negative, and developing and fixing the exposed coatings of said three separation-negatives, thereby providing each said separation-negative with a corrective-stratum on its negative-stratum and in register therewith.

4. In the method of correcting a set of yellow, red and blue separation-negatives of a subject, the following steps in any order consistent with the production of the specified results, making a positive-transparency from each of said three separation-negatives, coating the negative-stratum of each of the three separation-negatives with a light-sensitive medium, applying to the negative-stratum of each of said three separation-negatives the positive-transparency made therefrom and with the positive-stratum of the transparency in contact with the coating and in register with the negative, exposing said coatings to light through said applied positive-transparencies, removing said positive-transparencies from said separation-negatives, and developing and fixing said exposed coatings of said three separation-negatives thereby providing each thereof with a corrective-stratum in contact with, and in register with, its negative-stratum.

5. In the method of altering a color-separation negative of a subject, the following steps in any order consistent with the production of the specified results, making a positive-transparency from the color-separation negative to be corrected, making a reversed-developed negative from a different color-separation negative of the same subject, coating said negative-stratum of the first color-separation negative with a light-sensitive medium, applying said positive-transparency on, and in register with, said negative and with the positive-stratum of the transparency in contact with said coating, exposing said coating to light through said positive-transparency, removing said positive-transparency from the coated negative, applying said reversed-developed negative on, and in register with, said coated negative and with its negative-stratum in contact with said coating, exposing said coating to light through said reversed-developed negative, removing said reversed-developed negative from said coated negative, and developing and fixing said double-exposed coating, thereby providing said first negative with a corrective-stratum in direct contact with and in register with its negative-stratum.

6. In the method of modifying a set of photographic color-separation negatives of a subject, the following steps in any order consistent with the production of the stated results, making a positive-transparency from each of said negatives, coating each negative-stratum of said negatives with a light-sensitive medium after it has been employed for the production of its said positive-transparency, applying each said positive-transparency on, and in register with, the coated negative from which it was made with the positive-stratum of the transparency in contact with the coating, exposing each such coating to light through its applied positive-transparency, removing the transparencies from their exposed negatives, and developing and fixing said exposed coatings, thereby providing a set of modified color-separation negatives each with its alterative-stratum in contact with, and directly overlying, and in register with, its negative-stratum.

7. In the method of modifying a photographic-negative of a subject, the steps of making a photographic positive-transparency from the negative, thereafter applying a light-sensitive coating over the negative-stratum of said negative, applying said positive-transparency on, and in register with, said negative with the positive-stratum of the transparency in contact with said coating, exposing said coating to light through said positive-transparency, removing said positive-transparency from the negative after such exposure, and developing and fixing said exposed coating, thereby providing the negative with a corrective-stratum overlying and in direct contact with the negative-stratum of the negative.

8. The method presented in claim 1 in which said coating is a collodion-emulsion.

9. In the method of altering a set of color-separation negatives, the following steps in any order consistent with the production of the specified results, applying light-sensitive coatings to the negative-strata of at least some of said separation-negatives, making positive-transparencies from at least some of said separation-negatives, making reversed-developed negatives from at least some of said separation-negatives, exposing at least some of said coatings to light through the positive-transparencies made from the same separation-negatives with their positive-strata in direct contact with said coatings, exposing at least some of said coatings to light through said reversed-developed negatives made from other than the separation-negatives to which they are applied, said reversed-developed strata during such exposures being in direct contact with said coatings, and developing and fixing said exposed coatings after said positive-transparencies and said reversed-developed negatives have been removed therefrom.

10. A corrected photographic-negative having on its negative-stratum a corrective stratum incorporating a negative representation of the same subject and a positive representation of the same subject both in register with said negative-stratum.

11. A corrected photographic color-separation negative having on, and in register with, its negative-stratum, a corrective stratum incorporating a negative of the same subject and a positive from a different color-separation negative of the same subject.

12. A set of corrected photographic color-separation negatives of a subject, each having on, and in register with, its negative-stratum, a corrective stratum incorporating a negative representation of the same subject and same color-separation and a positive representation of the same subject but of a different color-separation.

WILLIAM J. WILKINSON.